United States Patent [19]

Selleck

[11] 4,348,949

[45] Sep. 14, 1982

[54] NON-SATURABLE BUN

[76] Inventor: George L. Selleck, 16-B Division St., Glens Falls, N.Y. 12801

[21] Appl. No.: 702,828

[22] Filed: Jul. 6, 1976

Related U.S. Application Data

[62] Division of Ser. No. 583,806, Jun. 4, 1975, abandoned, which is a division of Ser. No. 30,764, Apr. 22, 1970, Pat. No. 3,908,022.

[51] Int. Cl.³ .......................... A21D 13/00; A21B 3/13
[52] U.S. Cl. ........................................ 99/426; 99/377; 99/428; 99/439; 426/94; 426/391
[58] Field of Search ................. 99/426, 372, 377, 378, 99/379, 380, 381, 428, 439; 425/98, 238; 426/94, 128, 138, 279–280, 282–284, 391, 496, 502–503, 512, 27, 95, 124

[56] References Cited

U.S. PATENT DOCUMENTS

| | | | |
|---|---|---|---|
| 746,971 | 12/1903 | Marchiony | 99/372 UX |
| 809,100 | 1/1906 | Diener | 426/94 |
| 1,034,581 | 8/1912 | Burky | 99/377 |
| 1,696,343 | 12/1928 | Burdick | 99/428 UX |
| 1,809,383 | 6/1931 | Heyboer | 426/94 |
| 1,910,620 | 5/1933 | Mabey | 426/391 |
| 2,111,021 | 3/1938 | Bemis | 426/391 X |
| 2,204,045 | 6/1940 | Meacham | 426/496 |
| 2,330,410 | 9/1943 | Cyr | 99/439 |
| 2,570,374 | 10/1951 | Pompa | 99/426 X |
| 2,604,841 | 7/1952 | Kirby | 99/439 X |
| 3,326,119 | 6/1967 | Smith | 99/428 |
| 3,379,120 | 4/1968 | Fogle | 99/439 |
| 3,385,205 | 5/1968 | McCloud | 99/439 |
| 3,831,507 | 8/1974 | Wheaton | 99/428 |

*Primary Examiner*—Harvey C. Hornsby
*Assistant Examiner*—Joseph M. Pitko
*Attorney, Agent, or Firm*—Pollock, Vande Sande & Priddy

[57] ABSTRACT

A bun is baked with a channel therein for holding liquified food preparations. The channel is made to resist saturation by being hard baked to form a thick crust. This is done by using a two-part baking utensil having a channel-forming surface on one part. The bun is baked with the channel-forming surface on the bottom and with more heat being applied to the channel-forming surface than is applied to the other parts of the bun. Ribs may be simultaneously baked into the channel to prevent outflow of the liquid as the food is consumed.

7 Claims, 4 Drawing Figures

NON-SATURABLE BUN

CROSS REFERENCE TO RELATED APPLICATIONS

This application is a divisional of U.S. patent application Ser. No. 583,806 filed June 4, 1975 which will become abandoned upon the filing of the present application. Application Ser. No. 583,806 is a divisional of U.S. patent application Ser. No. 30,764 filed Apr. 22, 1970 and issued Sept. 23, 1975 as U.S. Letters Patent No. 3,908,022.

BACKGROUND OF THE INVENTION

This invention pertains to the art of baking buns and in particular relates to buns which are intended to be filled with liquified foods and sauces and held in the hand for eating.

Hot dogs, hamburgers, and other hand-held foods are familiar items. Lately, extension and further development in the art of preparing such foods has been taking place. For example, one now sees barbecued beef sandwiches which resemble hamburgers and chili dogs which resemble hot dogs. Items such as these incorporate a certain amount of solid food with a sauce. Anyone who has eaten them may well recall that the sauce causes certain problems. For one thing, it tends to flow out of the sandwich and onto the person's hand as he is eating. Also, the sauce tends to saturate the roll and make it rather soggy before the article can be completely consumed. Thus, it would be highly desirable if a bun could be baked so that it would hold sauces and other like liquids without permitting them to easily flow out of the bun and onto the person's hand, and if the bun itself would not saturate for a relatively longer period of time than is now the case.

Some prior schemes and devices seem to have been made with a view toward accommodating the insertion of foods. For example, U.S. Pat. No. 2,330,410 to R. E. Cyr shows an apparatus for making hot dog rolls having a channel to accommodate the hot dog. Similarly, U.S. Pat. No. 3,385,205 to C. V. McCloud concerns itself with the shape of a bun being baked for reception of meat such as weiners and other foods and fillers. But to the best of my knowledge, neither these presents nor any other prior art article, apparatus or method concern themselves with the problems of saturation and food outflow discussed above.

It is, therefore, an object of this invention to provide a bun having a sufficiently thick and hard crusted interior channel to prevent the bun's being saturated when filled with partially creamed foods or foods suspended in sauce.

It is a further object of this invention to provide a bun having a channel therein with transverse ribs so as to help retain such types of food therein as the bun is consumed.

It is a further object of this invention to provide an apparatus for baking the bun having the above features.

Finally, it is an object of this invention to provide a method for baking buns having the above features.

The objects of this invention are accomplished through the use of a baking utensil having a channel-forming surface therein and by applying relatively more heat to the channel-forming surface than is applied to the other parts of the utensil.

Also, means are provided for insuring that the dough being baked is held in close contact with the channel-forming surface.

DETAILED DESCRIPTION OF THE PREFERRED EMBODIMENT

Figure 1:
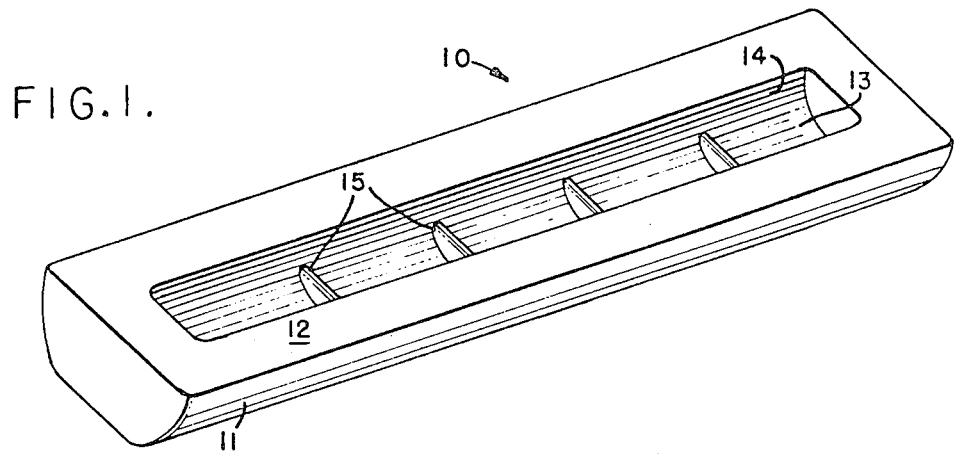
FIG. 1 is a perspective view of the bun which it is intended to produce by means of this invention.

Referring now to FIG. 1, there is shown a bun of the type desired, generally designated by the numeral 10. The exterior wall 11 and the upper surface 12 of the bun have a baked finish much like that normally found on a dinner roll. There is an interior channel 13 having walls 14. The texture of the walls 14 is hard crusted in nature and may be compared generally with the crust formed on the so-called hard roll or the crust of a loaf of Vienna bread.

Within the channel 13 there are a number of transverse ribs 15. These are also constructed of bread formed in the fashion of a rib during the baking process.

In actual use the bun 10 serves a dual function. In the first place, the bun itself is, of course, to be eaten as a suitable food to accompany whatever it is filled with. Secondly, the bun serves as a vessel for holding foods prepared in sauces or liquified food preparations. This function is possible as a result of the hard-crusted texture of the wall 14. This texture does not saturate easily and the bun can be held for longer than the normal eating time without its becoming saturated. Examples of the kinds of preparations that can be used with this bun are creamed turkey, chopped hot meatballs with sauce, chipped beef in cream, veal and peppers in their usual sauce, and other types of hot fillings. As the bun and filling are consumed, the ribs 15 tend to hold the remaining filling in place, thereby preventing it from running out.

Figure 2:
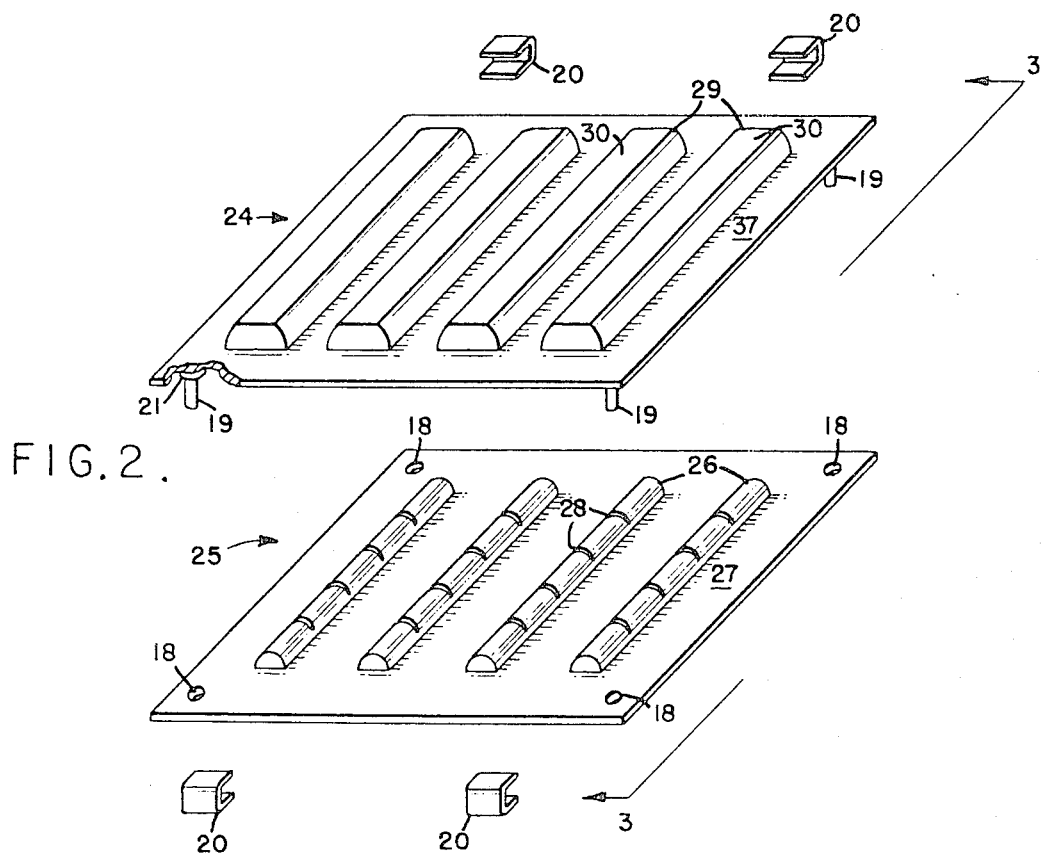
FIG. 2 is an exploded perspective view of the baking utensil embodying the invention.

Referring now to FIG. 2, there is shown an exploded view of one embodiment of a baking utensil which has been found suitable in practicing this invention. This baking utensil is comprised mainly of two parts, an upper member 24 and a lower member 25. The lower member has one or more channel-forming surfaces generally designated by the number 26. These surfaces protrude upwardly from a flat portion 27. Also the lower member includes extensions beyond the boundaries of the channels. Upper member 24 and lower member 25 can be made from a suitable sheet metal material.

For reasons that will appear later, it is desirable that the underside of the channel-forming surfaces be hollow. In other words, if one were to turn over lower member 25 of FIG. 2 and look on its underside, one would see elongated cavities therein, formed generally by the backs of channel-forming surfaces 26.

Figure 3:
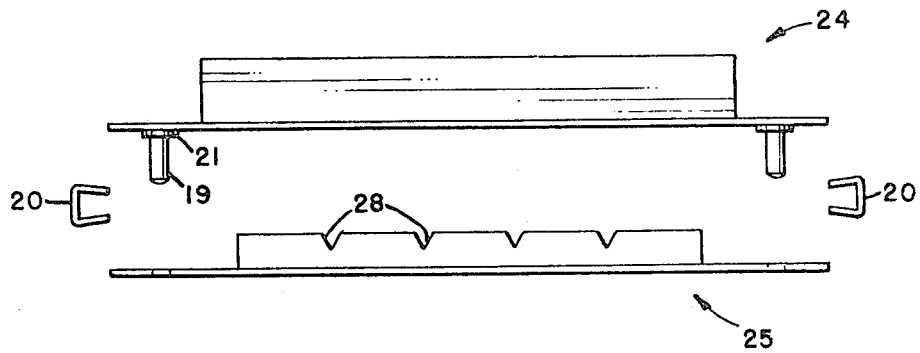
FIG. 3 is an end view of a portion of FIG. 2 looking in the direction of the arrows along line 3—3.

One or more rib-forming structures 28 may be formed upon the channel-forming surface 26. FIG. 3 shows these as grooves when the lower member is viewed from the direction of the arrows on line 3—3 of FIG. 2. Of course, rib-forming structures 28 will protrude into the previously mentioned cavities which are formed by the back sides of the channel-forming surfaces 26.

Referring again to FIG. 2, one sees that at each of the four corners of lower member 25 a hole 18 is drilled for engagement with studs 19 which are mounted on upper member 24.

Upper member 24 has a number of dome-shaped members 29 equal to the number of channel-forming surfaces in lower member 25. Each of these dome-shaped structures opens downwardly to form a hollow recess and is shaped so as to generally surround its corresponding channel-forming surface 26.

Figure 4:
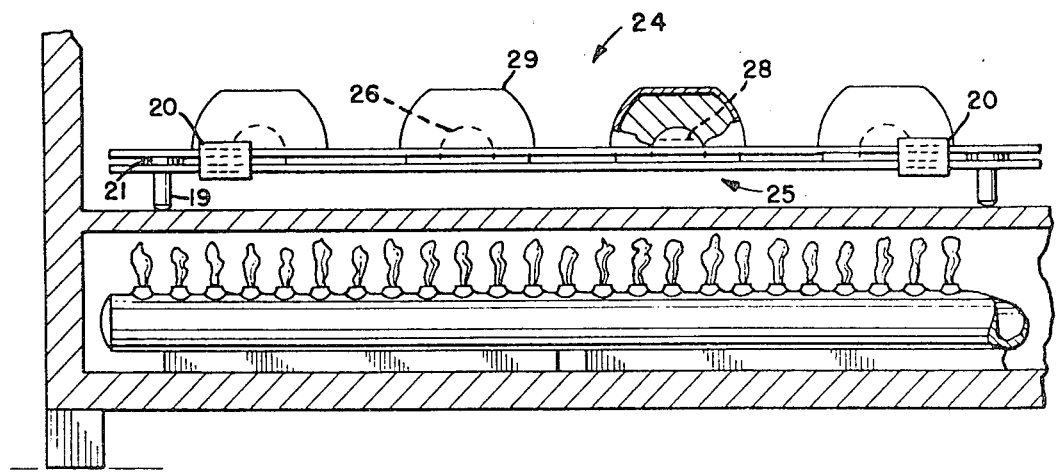
FIG. 4 shows the apparatus of FIG. 2 assembled and in place during baking.

The studs 19, previously mentioned, are each mounted with an associated spacer 21, as can be seen from the portion of upper member 24 which is broken away. It will be appreciated that when upper member 24 is assembled with lower member 25, the spacers 21 will tend to hold the said members a fixed distance apart from one another. Thus, there will be an open space between upwardly facing flat surface 27 of lower member 25 and corresponding downwardly facing flat surface 37 of upper member 24. Also, the dimensions of channel-forming surface 26 are relatively smaller with relation to the interior dimensions of the dome-shaped structure 29 so that there will be a fixed amount of open space between channel-forming surfaces 26 and the interior of the dome-shaped structure 29 when the utensil is assembled. This spaced relation between upper member 24 and lower member 25 is maintained by the use of clips 20. These clips are fastened around upper member 24 and lower member 25 after assembly, as shown in FIG. 4 and prevent said members from moving apart as the pressure of the baking bread develops.

In practice, one utilizing the invention would prepare the baking dough and permit it to rise partially before placing in the baking utensil of FIG. 2. Experience has indicated that when using ordinary bread-baking dough, a suitable waiting period for this purpose is 45 minutes at ordinary room temperatures. This may be called the "first rise" and generally results in a doubling of size of the dough. The "second size" is carried out in upper member 24. This member would be placed on a table with the studs facing up and a suitable amount of partially risen dough would be laid in the dome-shaped structures 29. Upper member 24 would then be placed on a warm surface for additional rising. It has been found desirable to obtain the desired amount of rising using ordinary bread dough by maintaining the warmed surface at approximately 125 degrees Fahrenheit and leaving the upper member thereon for approximately 10 to 12 minutes. The reason for conducting this second rise is that it renders the dough more manageable in the utensil. When the dough is first placed in upper member 24 after the first rise is is somewhat springy and when stretched to the corners of the dome-shaped structure 29, it will creep back, leaving open spaces at the end thereof. Once the second rise has taken place, the dough may again be stretched to the extremities of the dome-shaped structure 29 and it will remain there.

It may be mentioned in connection with the second rising that dome-shaped structure 29 may be formed with a flat surface 30 therein which will rest on and be in contact with the warmed surface, thereby promoting the condution of heat to the rising dough.

Following the second rising, lower member 25 is placed with its protruding channel-forming surfaces 26 down, on top of upper member 24 and pressed against the partially risen dough until contact is made with spacers 21. Then clips 20 are slipped over the edges of upper member 24 and lower member 25 so as to hold them in that relation against the pressure of the dough.

Now, the "third rising" will be conducted. For this purpose the entire assembled utensil is inverted and placed on the same warmed surface where the second rising occurred. One will appreciate that the utensil will be standing on the studs 19 and thus be maintained a short distance above the surface. Also, the previously-mentioned cavities on the back side of channel-forming surfaces 26 are in an advantageous position to capture the rising heat and promote rising. This final rising process occurs in approximately 15 to 20 minutes if the warmed surface is maintained at a temperature of approximately 125 degrees Fahrenheit.

Once the dough is finally risen as previously described, the final baking process takes place. This is accomplished by the application of ordinary baking temperatures (350 to 450 degrees Fahrenheit) on the outside of the channel-forming surface 26. In the preferred method of using this apparatus, it is again permitted to stand on the studs 19 with the cavities on the outside of the channel-forming surfaces downward toward a source of heat. In this way, the rising heat is captured in the cavities, thereby promoting baking. Also, this method seems to have the advantage of employing gravity to keep the dough in close contact with the channel-forming surface. After a suitable baking period, say ten to fourteen minutes, the utensil may be removed from the oven and disassembled by removing clips and allowing the lower member to disengage. The completed roll may then be removed.

The dimensions used in one apparatus which proved satisfactory in following the procedures described above may be illustrated by considering the dimensions of the roll produced thereby. The roll shown in FIG. 1 has an overall length of $7\frac{5}{8}$ inches. Its overall width is $1\frac{3}{4}$ inches and the width of the channel 13 is $\frac{3}{4}$ inch. The length of the channel is $6\frac{5}{8}$ inches. The dimensions of the baking utensil in FIG. 2 including the relative depth of the channel-forming surfaces 26 and the dome-shaped structure 29 are such as to result in a nominal thickness of $\frac{1}{2}$ inch in the walls and bottom of the roll. Finally, the rib-forming structures 28 may be of a size suitable to a rib having a height of approximately $\frac{1}{4}$ inch at its highest point above the bottom of the channel.

Thus is formed a roll with the desired hard-crusted and relatively saturation-proof interior having a fine, soft-baked, dinner roll finish on its exterior. The ribs, besides tending to make the roll more useful, have the additional advantage that they tend to prevent breakage during a subsequent handling and packaging of the roll.

One can appreciate that the reason why the desired hard-crusted channel is formed is that more heat is applied to the baking channel than is applied elsewhere on the baking utensil. Also, care is taken to insure that the dough remains in tight contact with the channel-forming surface. In the preferred embodiment, just explained, these things are accomplished by inverting the entire utensil and allowing it to stand on the studs over a source of heat. It should not be inferred, however, that the process could not be equally successful by using some equivalent technique. Thus, what has been explained is merely the preferred embodiment of the invention in question. It is intended by the appended claims to encompass within their coverage all modifications and variations which properly come within the spirit of this invention.

What is claimed is:

1. Apparatus for baking a bun or the like of the type having a substantially liquid impermeable hard baked channel in its top surface for holding solid food and/or a liquid food substance, a relatively thinner crust on its bottom surface and a soft, smooth bread texture in its interior, said apparatus comprising:

first means defining at least one downwardly opening recess for forming the lower exterior of at least one bun said first means having a first downwardly facing surface extending beyond the boundaries of said recess, second means defining at least one upwardly extending thin-walled protuberance for forming at least one hard baked channel, said second means having a second, upwardly facing surface extending beyond the boundaries of said protuberance, the underside of each said protuberance being hollow for capturing heat to cause hard baking of the bun channel and to promote rising of the dough during operation of the apparatus, means including spacers for positioning said second means in mating relation beneath said first means with each said protuberance extending upwardly at least partly into a corresponding recess in said first part and with a predetermined open spacing between said first and second surfaces, means for applying heat to both sides of said first and second means in assembled mating relationship whereby said underside of each said protuberance of said second means is heated due to heat captured therein to a higher temperature than said first means, to thereby form a hard baked channel in the bun while the rest of the bun is baked less hard, means for positioning said first and second means in assembled mating relationship a predetermined open spacing above the heat source included in said means for applying heat, and means for preventing said first means and said second means from moving apart as the pressure of baking breads develops during operation of the apparatus.

2. The apparatus of claim 1 wherein said at least one protuberance has at least one transverse groove to form a corresponding rib in the bun channel.

3. The apparatus of claim 2 wherein said at least one protuberance is generally arcuate in transverse cross-section to the length of the channel.

4. The apparatus of claim 1 wherein said means for positioning said first and second means comprises downwardly extending stud means mounted on said first means which when assembled pass through and below corresponding holes in said second means.

5. The apparatus of claim 4 wherein each of said stud means comprises spacer means for providing said predetermined open spacing between said first and second means.

6. The apparatus of claim 1 wherein said first surface comprises a substantially flat portion with at least one recess to form said lower exterior bun portion, and said second surface comprises a substantially flat portion with at least one protuberance which when assembled mates with said at least one recess, and which is smaller than the interior of said at least one recess.

7. The apparatus of claim 1 wherein said means for preventing comprises clips fastened around said first and second means.

* * * * *